F. W. ARNOLD.
FISH NET.
APPLICATION FILED SEPT. 24, 1917.
1,310,553.
Patented July 22, 1919.
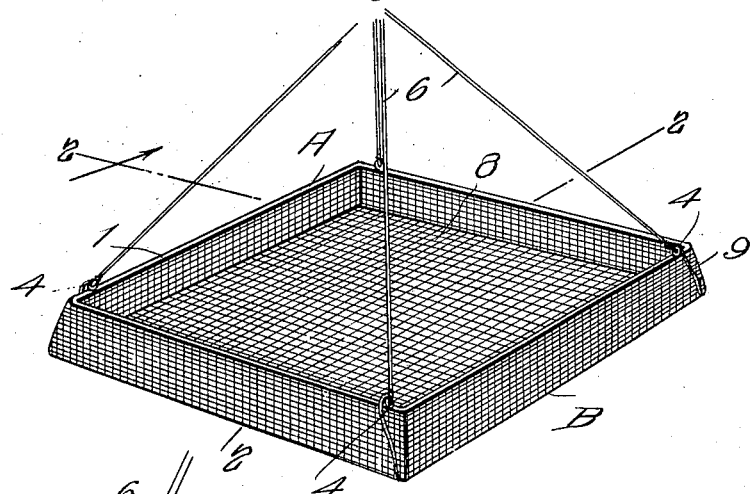
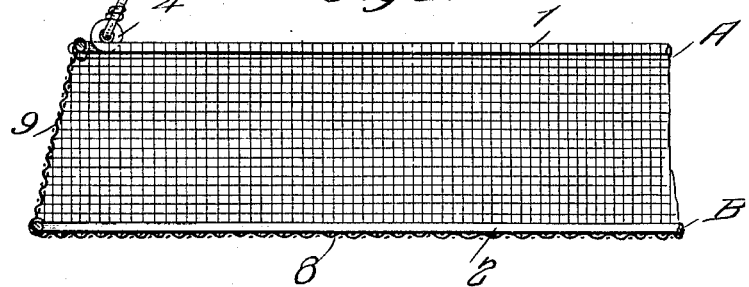
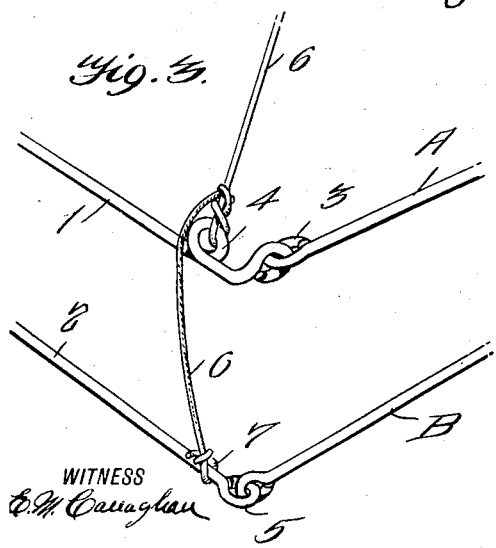
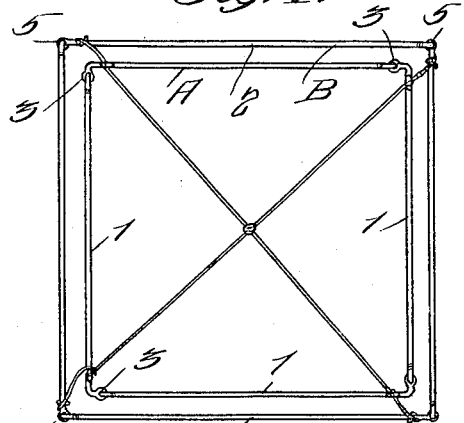
WITNESS
INVENTOR
FRED W. ARNOLD,
BY
ATTORNEYS

UNITED STATES PATENT OFFICE.

FRED WARREN ARNOLD, OF CAMBRIDGE, OHIO.

FISH-NET.

1,310,553. Specification of Letters Patent. Patented July 22, 1919.

Application filed September 24, 1917. Serial No. 193,009.

*To all whom it may concern:*

Be it known that I, FRED WARREN ARNOLD, a citizen of the United States, and a resident of Cambridge, in the county of Guernsey and State of Ohio, have invented new and useful Improvements in Fish-Nets, of which the following is a specification.

My invention is an improvement in fish nets, and has for its object to provide a simple, inexpensive net of the dip type, wherein, when not in use, the net will fold into small compass and, when in use, will prevent the escape of the fish.

In the drawings:

Figure 1 is a perspective view of the improved net;

Fig. 2 is a section on the line 2—2 of Fig. 1, looking in the direction of the arrows adjacent the line;

Fig. 3 is a perspective view of a portion of the frame; and

Fig. 4 is a top plan view of the frame.

In the present embodiment of the invention, upper and lower substantially rectangular frames A and B are provided, the said frames being similar, the frame B, however, being of greater diameter than the frame A so that the frame A, when the device is nested, will seat within the frame B. These frames, as shown, are composed of links 1 and 2, respectively, each of the links 1 of the frame A having at each end an eye 3, and one end of each link is bent so that the eye stands at approximately a right angle to the body of the link. The eyes 3 of the links are engaged with each other, and each of the links 1 is provided near the angularly bent end with a second eye 4 for a purpose to be presently described.

The links 2 are provided at their ends with eyes 5 which interengage, and the engagement is at the corners of the frame. Bails 6 are connected with the eyes 4, and the said bails at their upper ends are connected with a ring or the like which, in turn, may be connected to a pole for dipping the net. Each of these bails is extended beyond the eye 4 to a connection with the adjacent member 2 of the frame B, as indicated at 7, and this connection is of sufficient length to not interfere with the unfolding of the net. The frame B is closed by reticulated material 8 of suitable mesh, and this material is extended beyond the sides of the frame upwardly and inwardly, as indicated at 9, to a connection with the upper frame.

In use, the net is dipped until the lower frame rests upon the bed of the stream, with the upper frame seated within the lower frame. At the proper time the net is raised vertically, the first movement raising the top frame until the sides 9 are extended, and a pen is thus formed to prevent the fish from escaping from the net. The lifting movement, when continued, will withdraw the net from the water, with the fish therein. The articulated arrangement of the frames permits the net to fold within a very small compass.

I claim:

A net of the character specified comprising upper and lower substantially rectangular frames, the upper frame being of smaller size than the lower frame to nest within the same, a covering of reticulated material for the lower frame and the adjacent sides of the frames, bails of flexible material connected with the corners of the upper frame, said upper frame having eyes near its corners to which the bails are connected, and the said bails being extended loosely to connect with the lower frame.

FRED WARREN ARNOLD.

Copies of this patent may be obtained for five cents each, by addressing the "Commissioner of Patents, Washington, D. C."